(12) United States Patent
Schuda et al.

(10) Patent No.: US 7,883,561 B2
(45) Date of Patent: Feb. 8, 2011

(54) DEVICE FOR THE TANGENTIAL INTRODUCTION OF A GAS-LOADED LIQUID STREAM INTO THE HEAD OF A COLUMN

(75) Inventors: Volker Schuda, Landau (DE); Rupert Wagner, Worms (DE)

(73) Assignee: BASF SE, Ludwigshafen (DE)

( * ) Notice: Subject to any disclaimer, the term of this patent is extended or adjusted under 35 U.S.C. 154(b) by 357 days.

(21) Appl. No.: 12/067,250

(22) PCT Filed: Sep. 20, 2006

(86) PCT No.: PCT/EP2006/066551
§ 371 (c)(1),
(2), (4) Date: Mar. 18, 2008

(87) PCT Pub. No.: WO2007/033971
PCT Pub. Date: Mar. 29, 2007

(65) Prior Publication Data
US 2008/0202340 A1 Aug. 28, 2008

(30) Foreign Application Priority Data
Sep. 23, 2005 (DE) .................... 10 2005 045 534

(51) Int. Cl.
*B01D 45/12* (2006.01)

(52) U.S. Cl. .................... 55/459.1; 55/418; 55/419; 55/459.5; 95/187; 95/219; 95/269; 95/271; 95/236; 96/155; 96/209; 96/216; 96/321; 210/787; 210/788; 210/512.1

(58) Field of Classification Search ........... 55/459.1, 55/459.5, 418, 419, 529; 95/185–187, 219, 95/269, 271, 235–236; 96/155, 204–209, 96/216, 321; 210/787–788, 512.1
See application file for complete search history.

(56) References Cited
U.S. PATENT DOCUMENTS
1,402,784 A * 1/1922 Moore .................... 55/459.3
(Continued)

FOREIGN PATENT DOCUMENTS
GB 2342602 4/2000
(Continued)

Primary Examiner—Jason M Greene
Assistant Examiner—Dung Bui
(74) Attorney, Agent, or Firm—Connolly Bove Lodge & Hutz LLP

(57) ABSTRACT

The present invention relates to an apparatus for the tangential introduction of a gas-loaded liquid stream into the top of a column in which gas and liquid are separated. Entry into the column top proceeds through a conventional radially arranged port, to which, however, a special tube construction connects which ensures as smooth as possible non-turbulent flow and its tangential exit into the column top.

15 Claims, 3 Drawing Sheets

U.S. PATENT DOCUMENTS

| | | | | |
|---|---|---|---|---|
| 2,082,863 A | * | 6/1937 | Weisgerber | 96/216 |
| 2,974,419 A | | 3/1961 | Hauk et al. | |
| 3,171,807 A | * | 3/1965 | Neuman | 210/319 |
| 3,340,157 A | | 9/1967 | Weiss | |
| 3,443,364 A | * | 5/1969 | Saltsman | 96/313 |
| 3,885,931 A | * | 5/1975 | Schaller | 95/269 |
| 4,125,468 A | * | 11/1978 | Joh et al. | 210/321.8 |
| 4,278,550 A | * | 7/1981 | Watts | 210/741 |
| 4,343,772 A | * | 8/1982 | Frosch et al. | 422/200 |
| 5,227,061 A | * | 7/1993 | Bedsole | 210/304 |
| 5,599,365 A | * | 2/1997 | Alday et al. | 55/426 |
| 6,053,967 A | * | 4/2000 | Heilmann et al. | 96/208 |
| 6,902,596 B2 | * | 6/2005 | Conrad et al. | 55/459.1 |
| 7,004,997 B2 | | 2/2006 | Asprion et al. | |
| 2004/0154469 A1 | * | 8/2004 | Asprion et al. | 95/236 |
| 2006/0162559 A1 | | 7/2006 | Asprion et al. | |

FOREIGN PATENT DOCUMENTS

| | | |
|---|---|---|
| WO | WO-03/009924 A1 | 2/2003 |
| WO | WO-03/076049 A1 | 9/2003 |

* cited by examiner

DEVICE FOR THE TANGENTIAL INTRODUCTION OF A GAS-LOADED LIQUID STREAM INTO THE HEAD OF A COLUMN

The present invention relates to an apparatus for the tangential introduction of a gas-loaded liquid stream into the top of a column in which gas and liquid are separated, entry into the column top proceeding through a conventional radially arranged port, to which, however, a special tube construction connects which ensures as smooth as possible non-turbulent flow and its tangential exit into the column top.

In numerous processes in the chemical industry, gas streams occur which comprise acid gases, such as for example $CO_2$, $H_2S$, $SO_2$, $CS_2$, HCN, COS or mercaptans as impurities. These gas streams can be, for example, natural gas, synthesis gas from heavy oil or heavy residues, refinery gas or reaction gas produced in the partial oxidation of organic materials, for example coal or petroleum. Before these gases can be transported or further processed, the acid gas content of the gas must be significantly reduced. $CO_2$ must, for example, be removed from natural gas, since a high concentration of $CO_2$ reduces the calorific value of the gas. In addition, $CO_2$ in combination with the water frequently entrained in the gas streams can lead to corrosion in pipes and fittings.

It is known to remove the unwanted acid gas constituents from the gases by gas scrubbing using aqueous or nonaqueous mixtures of organic solvents as absorption media. In this method, use is made not only of physical, but also of chemical solvents. Known physical solvents are, for example, cyclotetramethylenesulfone (sulfolane), N-methylpyrrolidone and N-alkylated piperidones. Chemical solvents which have proved useful industrially are, in particular, the aqueous solutions of primary, secondary and tertiary aliphatic amines and alkanolamines such as monoethanolamine (MEA), diethanolamine (DEA), monomethylethanolamine (MMEA), diethylethanolamine (DEEA), triethanolamine (TEA), diisopropanolamine (DIPA) and methyldiethanolamine (MDEA), see, e.g. WO 03/009924.

The crude gas is treated with the liquid absorption medium customarily in the countercurrent flow method under pressure in an absorption apparatus. This produces firstly the scrubbed and desired pure gas and secondly the pressurized gas-loaded absorption liquid. The latter is generally fed to a desorption apparatus to recover the valuable absorption medium and to be able to feed it back to the absorption apparatus. In the desorption apparatus the gas-loaded absorption liquid is expanded. The pressure drop on entry into the desorption apparatus in particular in the case of modern and very high-performance absorption media, e.g. the tertiary aliphatic alkanolamines, e.g. methyldiethanolamine (MDEA), which have a very high absorption capacity for the abovementioned acid gases, causes intense escape of gas from the absorption liquid, so that, on introduction, certain measures are necessary to ensure long-lasting interference-free operation of a gas scrubbing unit having coupled absorption and regeneration columns.

The feed to regeneration columns have therefore been designed in many ways. Predominantly, these are radial feed variants; however, tangential feeds are also known. The accompanying FIGS. 1 and 2 show currently customary designs of what are termed flashing feeds to regeneration columns. Flashing feeds are taken to mean pressurized gas-loaded absorption liquid feeds which, on entry into a regeneration column operating at a significantly lower pressure, owing to the pressure drop, immediately flash off large amounts of the gas loading.

Figure 1:
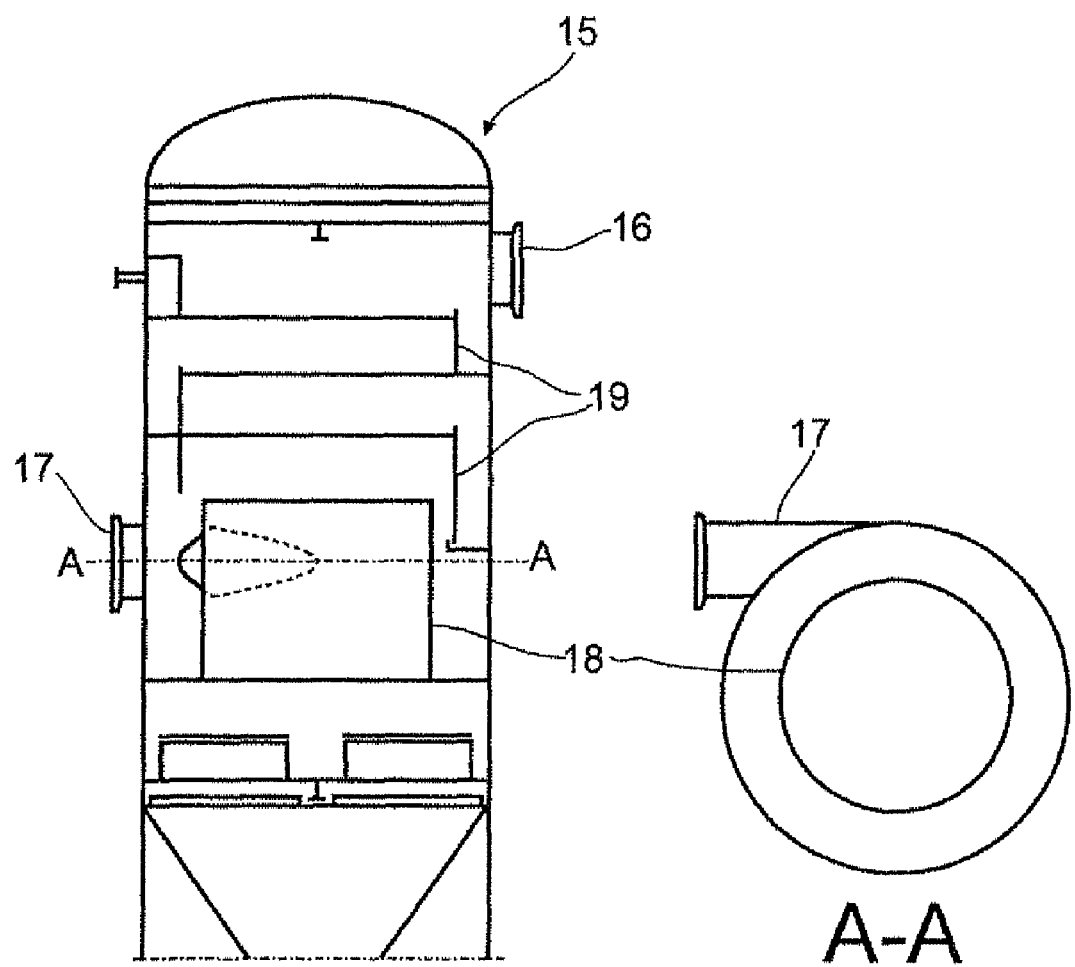
FIG. 1 is a diagram of a top of a regeneration column having tangential feed of the prior art.

As shown in FIG. 1, the top (15) of a regeneration column of the type in question here has a feed (17) for the gas-loaded absorption liquid. This feed opens into a gallery (18) at which the first large expansion of liquid proceeds and large amounts of gas are released. Above the gallery, internals (19) are provided. The released gases leave the column via the exit (16). The feed (17) shown in FIG. 1 opens tangentially into the column which is shown more clearly in the detail image A-A. This tangential feed ensures a low-turbulence gentle transition into the column and a uniform release of the gas load, so that no rapidly changing and/or asymmetrical impulse forces occur, which in the long run would lead to damage of the column or the internals owing to changing loading. A tangential design of the feed is therefore advantageous to essential, in particular in the case of flashing feeds.

The majority of the regeneration columns currently in operation, however, are provided with a radial feed, as shown in FIG. 2 by way of example.

Figure 2A:
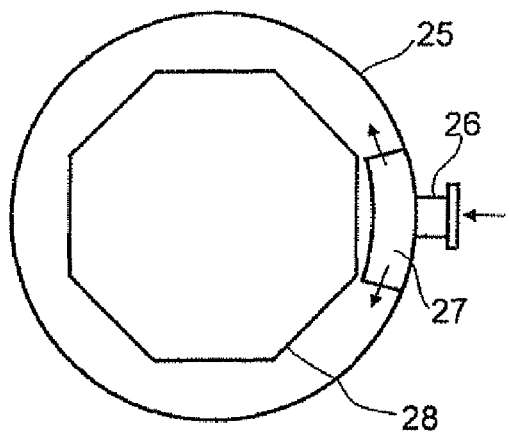
FIG. 2 shows diagrammatically three radial feed variants of the prior art.
Figure 2B:
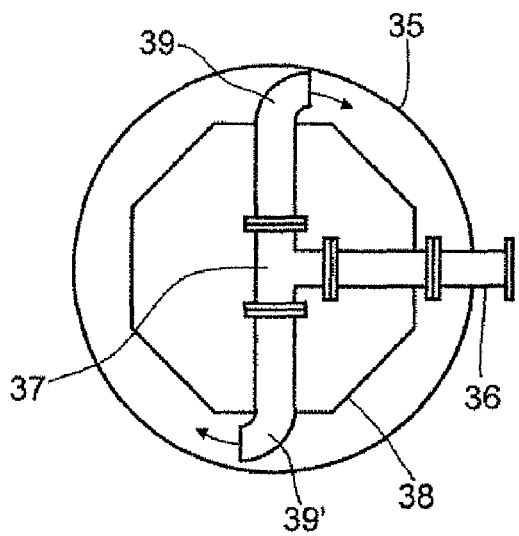
Figure 2C:
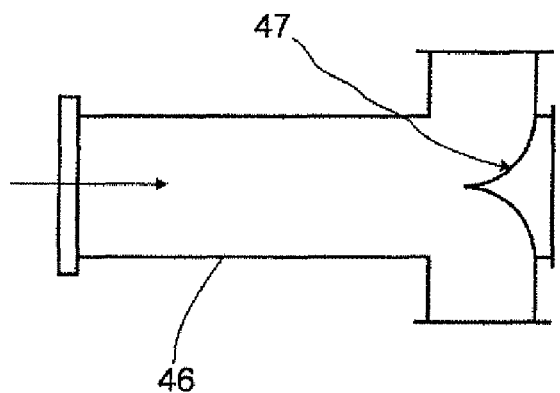

FIG. 2 shows three embodiments of radial feeds in three sectional drawings a, b and c. The sectional drawings a and b are cross sections through a regeneration column of the type shown in FIG. 1 at the height of the section A-A. The cylindrical shell (25, 35) of a regeneration column has a radial feed (26, 36) which, in the case of the embodiment shown in FIG. 2a, opens directly into a deflector (27) adjacent to the inner wall of the column, in which deflector the influent stream divides and is abruptly deflected by 90°. In the gallery (28) the two countercurrent flow streams exiting from the deflector (27) are then distributed. The abrupt deflection of the influent stream in the deflector (27) with simultaneous expansion leads to intense turbulence, knocks and bumps which act on the entire column top and its internals, so that in the long run damage is unavoidable. The situation is similar in the embodiment shown in FIG. 2b. The radial feed (36) conducted through the cylindrical column wall (35) is joined to a T piece (37) arranged in the axial center of the column, the ends of which T piece (39, 39') are bent at an angle of 90° in the T plane into the space between gallery (38) and column shell (35). The influent stream in this case is actually abruptly deflected twice by 90° in each case which, as in the case described above, causes considerable turbulence, knocks and bumps in the column top. In this case also, in the long run damage is unavoidable. Wedge-shaped flow dividers, as shown in FIG. 2c, bring no significant improvement. The wedge-shaped flow divider (47) of necessity has somewhat narrow radii, so that the 90° deflection also proceeds very abruptly. The flashing feed develops a lot of gas in this expansion stage. The change between compressible medium (gas) and incompressible medium (liquid) then causes the abovementioned knocking and bumping of the influent stream and in the long run unavoidable damage.

It is therefore an object underlying the invention to provide an apparatus for introducing a gas-loaded liquid stream into the top of a regeneration column in which gas and liquid are separated, which apparatus can be connected to a conventional radial feed, but does not have sudden 90° flow deflections, but in the result makes possible a low-turbulence tangential introduction of a gas-loaded liquid stream into the top of a regeneration column.

This object is achieved by an apparatus of the above described type which has a first tube bend having an angle of curvature γ<90° which is arranged at the entry of a radial feed line for the gas-loaded liquid stream into the column head, and a second tube bend which is joined to the first tube bend and has an angle of curvature γ'<90° which is curved contrarily to the first tube bend and is arranged in such a manner that an outlet orifice is situated in the vicinity of the inner wall of the column and allows the gas-loaded liquid stream to exit into the column essentially tangentially to the inner wall of the column.

It is advantageous to join the second tube bend to the first tube bend by a linear tube piece. The length of the linear tube piece is advantageously selected in such a manner that the outlet orifice of the second tube bend is shifted by about 90° relative to the entry into the column on the arc of the circle which describes the inner periphery of the column.

In one embodiment the inventive apparatus comprises exactly one outlet orifice which is expediently formed by the tube end of the second tube bend. Instead of a single outlet orifice from the second tube bend from which the entire gas-loaded liquid stream exits, a plurality, in particular two, outlet orifices can also be provided. In this case, the second tube bend is followed by a further tube bend (third tube bend). Between the second and third tube bends a part-outlet for the gas-loaded liquid is provided. The transition from the second tube bend to the third is expediently such that the substream exiting into the column exits into it essentially tangentially to the inner wall of the column and the other substream passes from the second tube bend into the third without sudden change in direction. In the case of two outlet orifices it is advantageous to select the outlet geometries and cross sections in such a manner that about half of the gas stream in each case exits from each outlet orifice. Curvature and length of the third tube bend are expediently selected in such a manner that the second outlet orifice is shifted by about 180° relative to the first outlet orifice on the arc of the circle which describes the inner diameter of the column. By the arrangement of two outlet orifices at points of the column wall which are opposite one another, impulse forces which act on the column on exit of the gas-loaded liquid into the column, largely mutually compensate each other.

The angles of curvature γ and γ' of the two tube bends can be identical or different and be 30 to 60°, in particular 40 to 50°; advantageously each angle of curvature γγ' is about 45°.

It is advisable to reinforce the inner wall of the column in the region of the outlet orifice of the second tube bend and a piece far downstream, since in this region the liquid stream introduced impacts on the column wall and gives off a considerable part of its gas load. When there is more than one outlet orifice, a similar procedure can be followed for the further outlet orifices.

The inventive apparatus has the advantage that, instead of the known radial feeds into customary regeneration columns, the type in question here can be installed with no complex conversion work or changes in the column itself being necessary. The problem-free replacement of customary radial column feeds by the inventive tangentially-introducing apparatus is of great practical importance, since improved absorption media for the gas scrubbing are continually being developed and provided, which, for example, have a higher absorption capacity for the acid gases to be absorbed and also release them more readily and more completely. If in a regeneration column a customary absorption medium having a very high chemical binding to the acid gas to be absorbed (e.g. $CO_2$) is then swapped for an improved absorption medium, e.g. methyidiethanolamine (MDEA), in an operation called a "solvent swap", then generally the above described problems with the known radial feeds occur, namely the production of turbulence, knocks and bumps in the column top, which in the long run can cause damage. In the past, therefore, "solvent swaps" had to be avoided.

As a result of the present invention, however, it is now possible to carry out such "solvent swaps" without problems.

The above described also applies to what are termed "revamps", which means the recommencement of operations of reconditioned plants which had previously been operated with less efficient absorption media and owing to the inventive apparatus can now be switched over to operations using modern improved absorption media.

The invention therefore also relates to the conversion of a regeneration column having known radial introduction of a gas-loaded liquid stream into a regeneration column having tangential introduction of the liquid stream, the known radial introduction being removed and the above described inventive apparatus being attached at its radial inlet port.

The inventive apparatus is thus suitable, in particular, for use in regeneration columns of units for acid gas scrubbing. If the absorption medium used for the acid gas scrubbing is an aqueous solution of at least one alkanolamine selected from MethylDiEthanolAmine (MDEA), MonoEthanolAmine (MEA), DiEthanolAmine (DEA), TriEthanolAmine (TEA), DiisopropanolAmine (DIPA), AminoDiEthylene Glycol (ADG), it is highly advisable to provide the regeneration column with an inventive tangential feed. Said absorption media have a particularly high absorption capacity for acid gases which they readily and very substantially give off again at reduced pressure. The gas load is therefore only released in a somewhat fault-free manner when a low-turbulence smooth tangential introduction proceeds of the gas-loaded liquid stream into the regeneration column. The inventive apparatus is particularly suitable for this. It is advantageous to select the total alkanolamine concentration of the aqueous absorption solution in the range from 38 to 50 percent by weight. In addition, it is advantageous to add piperazine, methylpiperazine and/or 3-methylamino-1-propylamine (MAPA) as activator to the aqueous absorption solution. When MDEA is used as absorption medium, conjoint use of said activators is particularly advantageous.

The present invention will be described in more detail on the basis of the accompanying FIG. 3.

Figure 3:
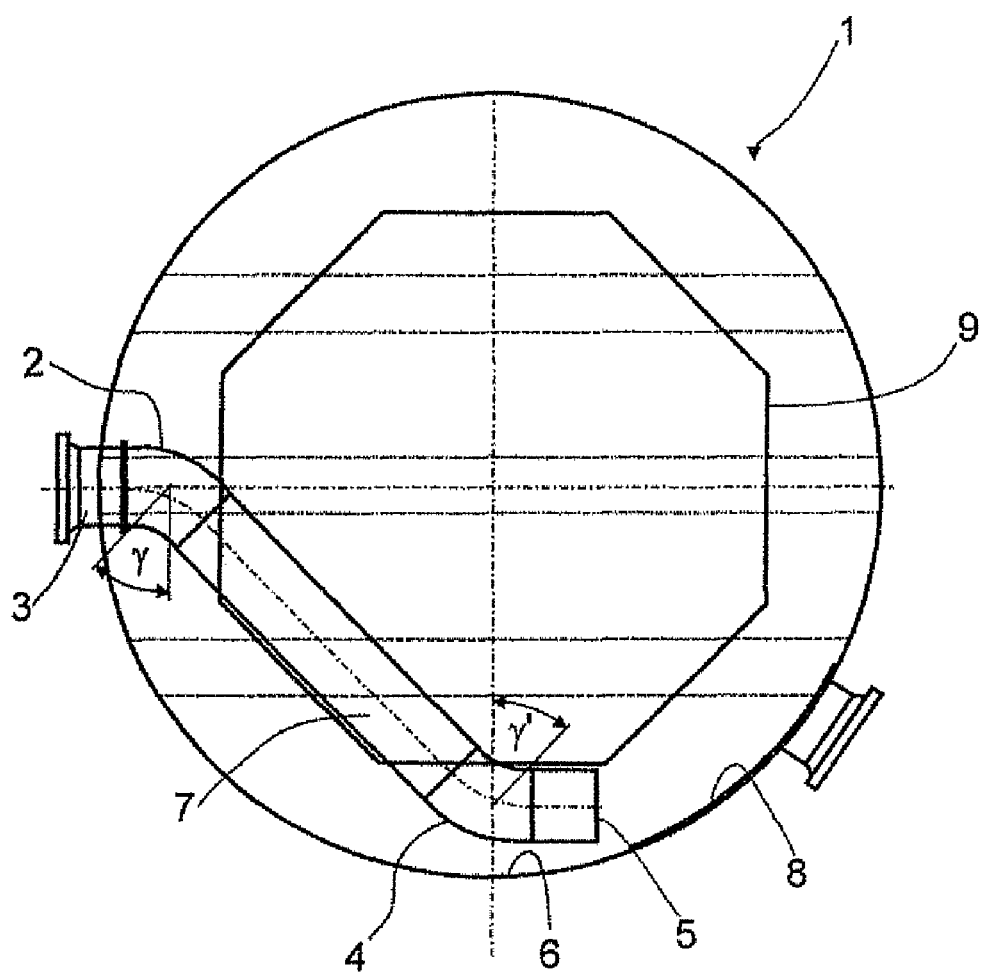
FIG. 3 shows an embodiment of the invention having one outlet orifice.

FIG. 3 shows diagrammatically the cross section of a regeneration column at the level of introduction of the gas-loaded liquid stream. The shell, denoted by 1, of the top of a regeneration column is provided with a radial feed line 3 which, after entry into the column, immediately changes into a first tube bend 2. At the entry point of the feed line 3 into the column a flange can be provided by which the inventive tube bend construction is attached to the feed line 3, The tube bend 2 shown in FIG. 3 has an angle of curvature γ of 45° and is joined to a linear tube piece 7 which transforms into a second contrarily curved tube bend 4. This second tube bend likewise has an angle of curvature (γ') of 45°. The length of the linear tube piece 7 is, in the case shown in FIG. 3, selected in such a manner that the second tube bend is shifted about 90° relative to the inlet port 3 on the arc of the circle which describes the inner periphery of the column. Its outlet orifice 5 is situated just in the vicinity of the column inner wall 6, so that on introduction of the gas-loaded liquid stream, this meets, in a virtually tangential manner, the inner wall 6 of the column 1, where the latter has a reinforcement 8. The incoming liquid stream is distributed in and on a customary gallery 9 in the column top. The inventive tube construction which converts a radial feed into a tangential feed has the shape of a horizontal elongate question mark or an elongate S.

As already described above, conventional radial liquid feeds, some embodiments of which are shown in FIG. 2, can be converted using the inventive apparatus in a very simple manner into tangential feeds, which again makes possible what are termed "solvent swaps" and "revamps".

The invention claimed is:

1. An apparatus for the tangential introduction of a stream of a gas-loaded absorption liquid into the top of a regeneration column of a unit for acid gas scrubbing, wherein the regeneration column has a radial feed line, the apparatus comprising a feed tube disposed within the regeneration column and fluidically coupled to the radial feed line, the feed tube having a first tube bend proximal to the radial feed line and a second tube bend distal from the radial feed line, both tube bends being characterized by angles of curvature of less than 90°, wherein the second tube bend is curved contrarily to the first tube bend and is arranged such that an outlet orifice of the feed tube is situated adjacent an inner wall of the regeneration column, thereby allowing the gas loaded liquid stream to exit the feed tube into the regeneration column essentially tangentially to the inner wall of the regeneration column.

2. The apparatus of claim 1, wherein the first and second tube bends have the same angle of curvature.

3. The apparatus of claim 1, wherein the first and second tube bends have angles of curvature ranging between 30° and 60°.

4. The apparatus of claim 1, wherein the first and second tube bends have angles of curvature of approximately 45°.

5. The apparatus of claim 1, the feed tube further including a linear tube section joining the first tube bend with the second tube bend.

6. The apparatus of claim 1, further comprising a reinforced section of the column in the region of the outlet orifice.

7. A method separating gas and liquid in a regeneration column of a unit for acid gas scrubbing, wherein the regeneration column has a radial feed line, the method comprising:
placing an absorption medium for acid gas scrubbing into the regeneration column; and
introducing a stream of gas-loaded absorption liquid into the top of the regeneration column via a feed tube disposed within the regeneration column and fluidically coupled to the radial feed line, the feed tube including a first tube bend proximal to the radial feed line and a second tube bend distal from the radial feed line, both tube bends being characterized by angles of curvature of less than 90°, wherein the second tube bend is curved contrarily to the first tube bend and is arranged such that an outlet orifice of the feed tube is situated adjacent an inner wall of the regeneration column, thereby allowing the gas loaded liquid stream to exit the feed tube into the regeneration column essentially tangentially to the inner wall of the regeneration column.

8. The method of claim 7, wherein the absorption medium for the acid gas scrubbing comprises an aqueous solution of at least one alkanolamine selected from the group of MethylDiEthanolAmine (MDEA), MonoEthanolAmine (MEA), DiEthanolAmine (DEA), TriEthanolAmine (TEA), DiisopropanolAmine (DIPA), and AminoDiEthylene Glycol (ADG).

9. The method of claim 7, wherein the aqueous solution has a total alkanolamine concentration of 38 to 50 percent by weight.

10. The method of claim 7, wherein the aqueous solution includes MDEA, which comprises one or more amines selected from the group of piperazine, methylpiperazine, or 3-methylamino-1-propylamine (MAPA) as activators.

11. The method of claim 7, wherein the first and second tube bends have the same angle of curvature.

12. The method of claim 7, wherein the first and second tube bends have angles of curvature ranging between 30° and 60°.

13. The method of claim 7, wherein the first and second tube bends have angles of curvature of approximately 45°.

14. The method of claim 7, the feed tube further including a linear tube section joining the first tube bend with the second tube bend.

15. The method of claim 7, further comprising reinforcing a section of the column in the region of the outlet orifice.

* * * * *